May 1, 1923.
C. W. CLINE
NUT LOCK
Filed Sept. 23, 1921
1,453,921
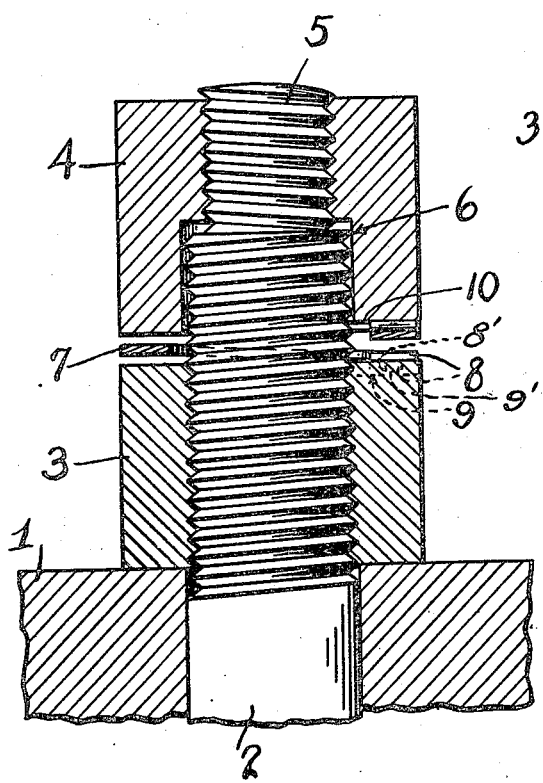
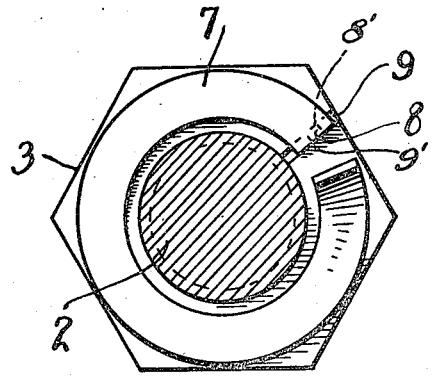
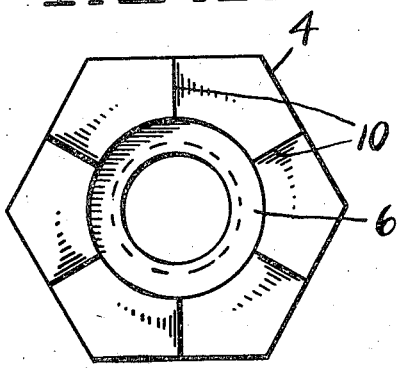
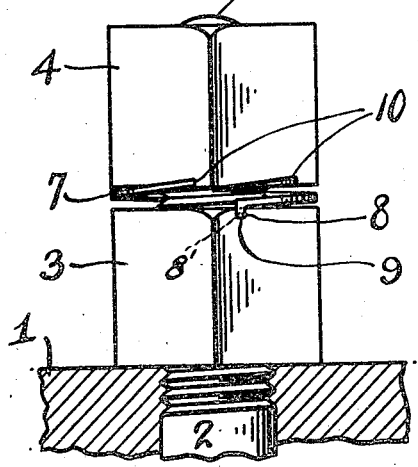
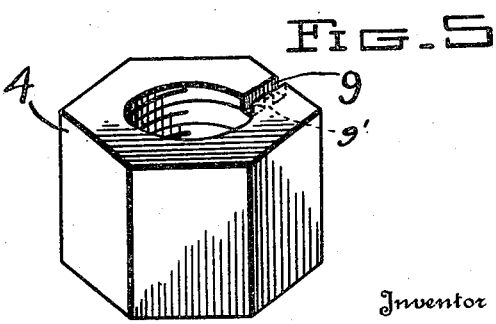
Inventor
Charles W. Cline
By L. B. James
Attorney Patented May 1, 1923.

1,453,921

UNITED STATES PATENT OFFICE.

CHARLES W. CLINE, OF AUGUSTA, KANSAS.

NUT LOCK.

Application filed September 23, 1921. Serial No. 502,743.

*To all whom it may concern:*

Be it known that I, CHARLES W. CLINE, a citizen of the United States, residing at Augusta, in the county of Butler and State of Kansas, have invented certain new and useful Improvements in Nut Locks, of which the following is a specification.

This invention relates to improvements in lock nuts, the principal object of the invention being to provide a pair of oppositely threaded nuts with a washer for locking them together, the washer being formed of spring metal.

Another object of the invention is to provide means for connecting one end of the washer to one nut and to provide teeth on the other nut one of which will engage the other end of the washer to hold the nuts against turning movement on the bolt.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view of the invention.

Figure 2 is an elevation with the work piece in section.

Figure 3 is a cross section taken above the washer.

Figure 4 is a bottom view of the top nut.

Figure 5 is a view of the bottom or main nut.

In these views 1 indicates the work piece or the object through which the bolt 2 passes and 3 indicates the main nut for holding the bolt in place and which bears against the piece 1. As is well known, this nut is liable to work loose due to vibrations and shocks and jars and cotter pins and the like have been used to keep the nut in place. Such means are unsatisfactory however and in order to eliminate the disadvantages of using such means I provide a second nut and a spring washer for locking the nuts together. This second nut is shown at 4 and it is provided with left hand screw threads to engage similar threads on a reduced part 5 of the bolt. The nut is also provided with a chamber 6 in its lower part to receive the extremity of the large part of the bolt. A spring washer 7 is located between the nuts and one end of this washer is provided with a bent part 8 which fits in a notch 9 in the main nut 3. The other end of the washer, which slopes upwardly, is adapted to engage one of a series of teeth 10 formed on the bottom of the nut 4. The part 8 is provided with a notch 8' for receiving a nib 9' which is located in the notch 9. This notch and nib prevents the part 8 from moving sidewise out of the notch 9.

It will thus be seen that when the second nut 4 is screwed home the ends of the washer will lock the two nuts together and prevent turning movement of the nuts on the bolt so as to keep the parts tight at all times.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A lock nut of the class described comprising a bolt having a reduced end having left hand screw threads thereon, a main nut engaging the bolt and having a notch in its outer end, a nib in said notch, a second nut having left hand screw threads for engaging the reduced end and teeth on its inner face and a split spring washer having a bent end engaging the notch with a notch therein to engage the nib, the other end of the washer engaging one of the teeth.

In testimony whereof I affix my signature.

CHARLES W. CLINE.